No. 619,007. Patented Feb. 7, 1899.
L. W. YOUNG.
COMBINED HEDGE AND WIRE FENCE.
(Application filed Dec. 27, 1897.)
(No Model.)
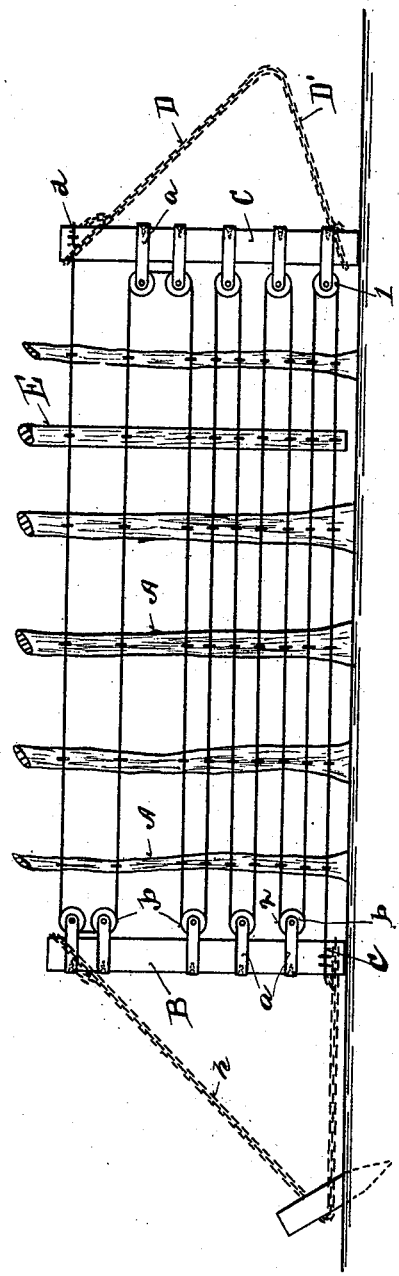
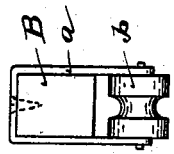
Witnesses
Oliver B. Kaiser.
W. R. Wood.
Inventor
Lorin W. Young
by Wood & Morris
Attorneys
THE NORRIS PETERS CO., PHOTO-LITHO., WASHINGTON, D. C.

UNITED STATES PATENT OFFICE.

LORIN W. YOUNG, OF DAYTON, OHIO.

COMBINED HEDGE AND WIRE FENCE.

SPECIFICATION forming part of Letters Patent No. 619,007, dated February 7, 1899.

Application filed December 27, 1897. Serial No. 663,690. (No model.)

*To all whom it may concern:*

Be it known that I, LORIN W. YOUNG, residing at Dayton, in the county of Montgomery and State of Ohio, have invented certain new and useful Improvements in a Combined Hedge and Wire Fence, of which the following is a specification.

The object of my invention is to form a combined wire and hedge fence from plants the stems of which are too large to be bent for plashing. Where hedge-plants have grown large, the bottom limbs drop off and the weaker plants die out, leaving quite large spaces between the vigorous plants. Such hedges do not turn stock, and it costs a great deal to cut down and grub up these fences preparatory to making a new one.

Another object of my invention is to employ these grown hedges instead of making a new hedge and to convert them into strong and durable combined hedge and wire fences admirably adapted to turn all kinds of stock.

The features of my invention are more fully set forth in the description of the accompanying drawings, making a part of this specification, in which—

Figure 1 is a side elevation of my improvement. Fig. 2 is a plan view of one of the sheaves and method of attaching the same to the posts.

My invention consists, generally, in straining a wire or series of wires in horizontal lines on a temporary structure along a line of large grown hedge trees or plants, stapling the wires to the stems of the plants when the desired tension is obtained, disconnecting the wires from the straining-posts and moving the straining mechanism along to stretch the wires and staple them to plants in an adjacent section or panel, and so forming the complete fence.

A A represent the plants, the stems of which are large and may be several inches in diameter. I first cut or saw the tops of the plants off at or near the desired height of the fence. I then, by means of a chain *h*, firmly anchor post B, loosely resting on the ground. Upon this post I fasten a series of adjustable sheaves *b*, preferably supported by a yoke *a*, the sheaves being journaled on the crosshead of the yoke.

C represents a second post, provided in the same manner with a series of sheaves supported on yokes. I then securely fasten one end of the wire, commencing at *c* on post B, thence run it around sheave 1 on post C, thence over sheave 2 on post B, and so on back and forth between the posts and around the sheaves serially until the top is reached, when the wire is secured firmly to the top of post C at *d*.

D D' represent an evener-chain rigidly connected to the top and bottom of post C. To this chain is connected any suitable straining device. This is preferably a ratchet-jack suitably anchored. When power is applied to the chain, post C is drawn bodily forward and the wire is strained between the point *c* on post B and the point *d* on post C, the wire playing over the sheaves until they are drawn taut, the tension being uniform on the series of wires between the two posts from top to bottom. I then staple or connect in any suitable manner each of the horizontal wires to the stems of the plants along the section of the hedge. The wires are then severed at the posts and the posts moved along to the adjacent section or panel of hedge and the wire stretched and stapled as before. The stapling of the wires to the solid plants under this tension effectually prevents them from spreading apart laterally, so that they will not allow the passage of stock, either large or small. Thus in my fence the plants themselves constitute the posts to which the wires are stapled, avoiding either the grubbing out of the old plants and the planting of new ones or the erection of a line of posts, and so effecting a considerable economy of time and money.

Another advantage is that the fence can be constructed one section at a time and the same posts used over and over again successively. In case the plants are too far apart in places I utilize the stems or limbs cut off and rest or set them on the ground and staple the wires to them.

E represents the stem cut off of one of the plants A.

Another advantage obtained by thus cutting off the plants at a suitable height and stretching the wire alongside of them and stapling them thereto is that when the plants throw out fresh shoots the new limbs will engage with the wires, forming an additional barrier of brush against the passage of stock. I have found by experience that a fence constructed in this manner upon large grown hedge-plants is much cheaper than the cost of building a new fence of any description. The fence thus produced is simple in construction and durable in operation and superior to any kind of wire fence now in use and affords a more effective barrier against the passage of stock. It is more durable than an ordinary plashed hedge fence and becomes effective from the very moment of construction without waiting for the growth of plants, which is necessary in forming a plashed hedge fence from small plants.

Having described my invention, I claim—

1. In a fence-wire-stretching device the combination of a movable post, and an anchored post, a series of sheaves attached to said posts at predetermined intervals, whereby a wire may be passed alternately from one post to the other over said sheaves and the whole simultaneously and uniformly strained in juxtaposition to a row of hedge-plants, substantially as described.

2. In a fence-wire-stretching device the combination of a movable post and an anchored post, means for simultaneously straining said posts in a common vertical plane, and a series of sheaves attached to said posts at predetermined intervals, whereby a wire may be passed alternately over said sheaves from the bottom of one post to the top of the other, and the same can be strained to a uniform tension and attached to a row of hedge-plants, substantially as described.

3. In a fence-wire-straining device the combination of a movable post and an anchored post, means for straining said posts apart in a vertical plane, a series of sheaves attached to said posts at predetermined intervals, the sheaves being journaled to revolve in the plane of the posts, whereby a fence-wire may be passed over said sheaves from one post to the other from top to bottom and simultaneously and uniformly strained between said posts in juxtaposition to a row of hedge-plants, the wires attached to said plants, severed, and the posts moved along to form another panel, substantially as described.

In testimony whereof I have hereunto set my hand.

LORIN W. YOUNG.

Witnesses:
 WALTER V. SNYDER,
 WM. W. CHAPMAN.